United States Patent [19]

McKinley et al.

[11] Patent Number: 4,844,335

[45] Date of Patent: Jul. 4, 1989

[54] MICROPROCESSOR CONTROLLED HEATING SYSTEM

[75] Inventors: Milton A. McKinley; Charles C. Castelli, both of Palisades Park, N.J.

[73] Assignee: Surgeonics Limited, Hudson Falls, N.Y.

[21] Appl. No.: 356,627

[22] Filed: Mar. 10, 1982

[51] Int. Cl.[4] .............................................. F24D 3/00
[52] U.S. Cl. ................................ 237/8 R; 236/46 R; 236/91 F
[58] Field of Search .................. 236/46 F, 46 R, 9 R, 236/91 B, 91 E, 91 F; 237/8 R, 8 C; 165/12, 11, 22, 91 R; 364/50 S

[56] References Cited

U.S. PATENT DOCUMENTS

| | | | |
|---|---|---|---|
| 4,192,455 | 3/1980 | Rasmussen et al. | 237/8 R |
| 4,205,381 | 5/1980 | Games et al. | 364/50 S |
| 4,290,551 | 9/1981 | Johnstone | 236/91 F |
| 4,381,075 | 4/1983 | Gargill et al. | 237/8 R |

OTHER PUBLICATIONS

American Stablis, Enertrol Operating Instructions, Jan. 1979.

*Primary Examiner*—Henry A. Bennett
*Attorney, Agent, or Firm*—Scully, Scott, Murphy & Presser

[57] ABSTRACT

A control system for a hydronic heating system for an enclosed structure which includes a boiler and at least one heating zone controlled by a thermostat and having a circulator or zone valve for controlling delivery of heat from the boiler to the heating zone(s). The control system senses the ambient temperature external to the enclosed structure, and also the water temperature of the boiler. Responsive to those two sensed values, it determines an upper temperature for the boiler at which the boiler is shut off. The control system further periodically redetermines the upper temperature for the boiler in accordance with the heating demands of the enclosed structure, and accordingly is heuristic in nature. In the preferred embodiment, a central processing unit forms the heart of the control system, and digitally stores in memory words representative of the sensed temperatures and other pertinent parameters relating to timing. The central processor is programmed to perform the function of periodically redetermining the upper temperature for the boiler in accordance with the immediate past heating demands of the heated structure, and also controls the circulators, in first and second heat dumping modes, to dump heat from the boiler after a thermostat is satisfied.

9 Claims, 13 Drawing Sheets

MICROPROCESSOR CONTROLLED HEATING SYSTEM

BACKGROUND OF THE INVENTION

1. Field of the Invention

The present invention relates generally to a microprocessor based control system for a hydronic heating system. More particularly, the subject invention pertains to a microprocessor based control system which is heuristic in nature, and controls the boiler and circulation of a heating system in accordance with presently sensed heating demands and the immediate past operating history of the heating system to control the operation thereof in an extremely efficient manner and thereby minimize operational costs.

2. Discussion of the Prior Art

In many conventional heating systems in the prior art an enclosed structure such as a building is heated by hot water circulated through a heat exchanger in the structure. The water is heated in a boiler having a burner in which 0 oil, gas or another fuel is burned, and a circulator pump circulates water between the boiler and the heat exchanger. During a heating season, the water in the boiler is often maintained between a minimum preselected temperature, usually around 160° F., and a maximum preselected temperature, typically around 190° F. When the structure is heated, the requisite heat is supplied via the heat exchanger from the circulating hot water which is cooled as a consequence thereof. The cooled water is circulated back to the boiler for reheating, and additional heat is supplied to the boiler from the furnace. Typically, a thermostat in a heating zone of the structure is used to initiate circulation and turn on the burner when calling for heat and to turn off circulation and the burner when there is sufficient heat in the region to satisfy the thermostat. The water in the boiler generally cools down slowly to the minimum temperature, and the boiler is then fired to reheat the water to the maximum temperature. In these systems a substantial amount of energy is often wasted by maintaining the boiler water within the preset temperature range regardless of the heating requirements of the buildings. Moreover, substantial quantities of heat are also lost up the flue because the furnace is continually recycled, and also abeyant heat remaining in the boiler and distribution pipes after a thermostat is satisfied is also generally wasted.

Keeney U.S. Pat. 4,108,375 is considered to be pertinent to the present invention, and discloses a boiler control arrangement in which the temperature of the boiler water is maintained just hot enough to provide sufficient heat for the enclosed building structure. This is accomplished by sensing the boiler water temperature and the outside ambient temperature, making a comparison between the two, and then controlling the operation of the boiler and the circulators based on the results of this comparison. This system controls both the boiler water temperature and the circulators which control the circulation of the boiler water through the system. As a zone thermostat within the enclosed building calls for heat, its respective circulator is turned on, and any one or all of the circulators may be operated at the same time. However, the circulator for the last zone to call for heat continues to run, even though its zone is not calling for heat, until another zone thermostat calls for heat. At least one circulator is kept running as long as the boiler water temperature is higher than a predetermined temperature. This predetermined temperature is chosen depending on the nature of the heating season in the area where the control device is employed. Thus, when the temperature of the boiler water drops to the predetermined temperature, all pumps are cut off. This will occur at the end of a heating season, while at the beginning of the next heating season, the first time that there is a demand for heat, the boiler is refired and when the boiler water temperature rises to the predetermined temperature the circulator pumps are again enabled to run.

The Keeney system effects a savings in the energy required to heat an installation by providing a more efficient control system than a standard heating arrangement. As each of the heated zones of the installation demands heat, the respective circulators are started or zone control valves are opened to permit the boiler water to flow through the zones being heated. As the demand is satisfied in each of the zones, the control valves or circulators are shut off. However, the heat is continued to be supplied to the last zone to call for it. By continuing to circulate the heating medium to the last zone to call for heat, a substantial amount of the heat that was put into the boiler is extracted for use in heating the installation.

However the Keeney control system suffers from a number of drawbacks, and is not capable of automatically modifying its target temperature once it has been manually set. The circulation control in the Keeney system is similar to normal thermostat control systems in that temperature satisfaction of the thermostat discontinues circulation unless it is the last zone to call for heat. This does not accomodate varying circulation periods based upon the different heating demands of the zones. Also, where domestic hot water is obtained directly from the boiler (tankless coil systems), no accomodation is made to permit the boiler to heat the water to the higher temperature required for domestic hot water.

SUMMARY OF THE INVENTION

Accordingly, it is a primary object of the present invention to provide a control system for existing hydronic heating systems which operates the heating systems in a more efficient manner than they are presently operated.

A further object of the subject invention is the provision of a control system of the aforementioned type which can be retrofitted in a relatively simple manner to existing heating systems.

Another object of the present invention is the provision of a heating system in which the temperature of the boiler water is maintained just high enough to satisfy the heating requirements imposed thereon by the heated structure and wherein inefficiencies introduced into the system by flue losses and loss of abeyant heat in the 0 circulation system and boiler are minimized.

In accordance with the teachings herein, the present invention provides a control system for a hydronic heating system for an enclosed structure which includes a boiler and at least one heating zone controlled by a thermostat and having a circulator or zone valve for controlling delivery of heat from the boiler to the heating zone(s).

The control system senses the ambient temperature external to the enclosed structure, and also the water temperature of the boiler. Responsive to those two sensed 0 values, the control system determines an upper temperature for the boiler at which the boiler is shut off. The control system further periodically redetermines the upper temperature for the boiler in accordance with the heating demands of the enclosed structure, and accordingly is heuristic in nature.

In the preferred embodiment, a central processing unit forms the heart of the control system and is responsive to first and second sensors for sensing the ambient temperature and the boiler water temperature to digitally store in memory words representative of the sensed temperatures. Further, the central processor is also programmed to perform the function of periodically redetermining the upper temperature for the boiler in accordance with the immediate past heating demands of the heated structure.

Moreover, the microprocessor based control system also measures the length of time between the burner being shut off and a request by a thermostat for delivery of heat into a heating zone, and is responsive thereto to increase the upper temperature for the boiler when the measured length of time falls below a predetermined time duration. In greater particularity, the upper temperature is increased in proportion to the difference between the measured length of time and the predetermined time duration.

The microprocessor based control system is also responsive to a thermostat request for delivery of heat being satisfied prior to the boiler water temperature reaching the upper temperature to incrementally decrease the upper temperature. The control system also functions to dump heat in the boiler in a first mode by continuing the delivery of heat into a heating zone, after a request by a thermostat has been satisfied, for a variable period of time inversely proportional to the measured length of time between requests for heat by that heating zone. In a second heat dumping mode, the delivery of heat into one specific heating zone, 0 considered to be the most difficult to heat, is continued after all mode one heat dumping is completed, and no thermostat in the heating system requests heat, and the ambient temperature is below a given threshold temperature, and the boiler water temperature is above a given threshold boiler temperature. In all microprocessor controlled modes, the control system fires the boiler only when a thermostat requests heat.

BRIEF DESCRIPTION OF THE DRAWINGS

The foregoing objects and advantages of the present invention for a microprocessor controlled heating system may be more readily understood by one skilled in the art with reference being had to the following detailed description of a preferred embodiment thereof, taken in conjunction with the accompanying drawings in which.

DETAILED DESCRIPTION OF THE DRAWINGS

Figure 1:
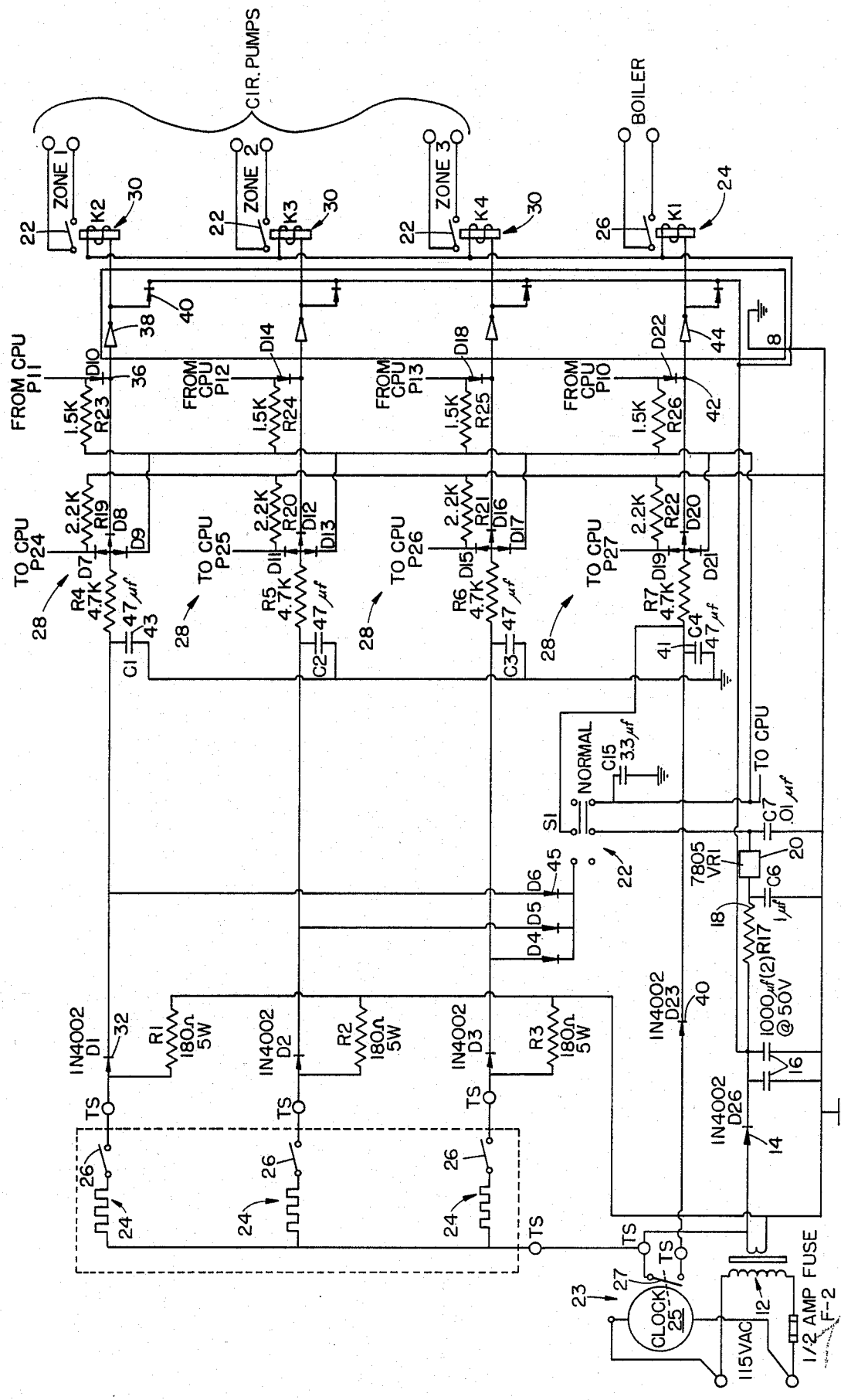
FIG. 1 is a schematic view of an electrical power supply and control circuit constructed pursuant to the teachings of the present invention.

It would be instructional before explaining the drawings and disclosed embodiments in detail to first explain the overall arrangement and operation of the microprocessor controlled heating system. The microprocessor based boiler control system is useful on single or multi-zone, oil or gas fired central hydronic heating systems in enclosed structures such as residential dwellings. The control system is essentially a variable aquastat which shuts off the burner when the boiler water temperature is sufficiently high to meet the heating load imposed by the structure. The cut-off temperature is calculated by the control system using as inputs the ambient outdoor air temperature and the heating characteristics of the structure which are inferred from its prior operating history. This approach allows the boiler water temperature to be held to a minimum, resulting in substantial fuel savings both during firing and standby periods.

Standby losses are further reduced by having the control system distribute heat in the boiler to the heating zones after the burner is shut off. The circulators are controlled so that one or more runs until the boiler water temperature drops below a given threshold temperature, such as 105° F.

Domestic hot water requirements are provided for tankless systems, wherein a heating coil in the boiler is 0 utilized to supply hot water, by the use of a programmable clock which overrides the control section of the microprocessor based system, thereby allowing the water temperature to rise to a desired level for specified time intervals.

The system basically controls the burner firing 5 time and up to three separate zone circulating pumps or zone valves. The control system monitors the outside ambient temperature, the boiler water temperature, and up to three zone thermostats.

The control system has two distinct sections, a hardware portion, and software or programming to operate the hardware, and is designed to be mounted in a grounded metal enclosure such that is not adversely affected by line voltage transients or electromagnetic interference.

The control system can be manufactured as a single sided, wave soldered, printed circuit board housed in a metal enclosure with a twenty-four hour programmable aquastat clock. In one designed embodiment, the circuit board consists of two distinct circuits, the first of which has a digital section based upon an Intel P8035 L or P8048 H, microprocessor. The microprocessor has associated therewith several integrated circuits i.e. analog/digital convertor, memory latch circuits, drivers, clock, etc. needed to perform the functions dictated by the software and mechanical section of the hardware. The second section incorporates all components necessary to interface the digital hardware to an existing boiler control system. In one embodiment, the second section was designed with: two permanently mounted relays to operate the burner and primary zone (10A, 120V); sockets to accommodate plug-in relays (10A ; 120V) to control two additional zones; a 24 volt transformer rated at 20VA; a 5 volt DC regulated power supply to power the microprocessor section; an LED malfunction indicator; a manual override switch to deactivate the control and allow the boiler to operate as before the new control system was installed; screw terminals or spade lugs for connection to the temperature sensors, burner, zone thermostats, zone circulators or valves, 110 volt input power, clock power 5 and clock switch.

Two temperature sensors are utilized by the control system, and are used to measure boiler water and outdoor ambient temperatures. These sensors can be encapsulated thermistors to protect them from the environment. In some embodiments the system can include an aquastat clock which is a twenty four hour programmable clock with one hour minimum settings which activates a switch to adjust for domestic hot water demand.

The software or computer program is preferably programmed in assembler language to allow for subsequent program modifications. A first primary function of the control system is to adjust the boiler water temperature until it is just hot enough to satisfy the heating requirements of the heated structure. This is accomplished by first measuring the outdoor temperature (once every 5 minutes, but using an average over the last 20 minutes). The temperature at which the burner is shut off is calculated 0 by the formula: Temp. Off. = Temp. Offset − (1.5) (Temp. Outside). Temp. Offset is a variable utilized to adjust Temp. Off, and is initialized (when power is first applied) to 205. The program then varies this value as it learns more about the heating system and the conditions with which it is interfaced.

Temp. Offset (and thereby Temp. Off) is increased when the program determines that the boiler water temperature is not high enough. If a zone calls for heat three minutes after the burner is shut off, then Temp. Offset (and thereby also Temp. Off) is raised by 1° every 15 seconds until the burner refires (5 minutes after it is shut off). Accordingly Temp. Offset can be raised as much as 8° during one burner off period.

The value of Temp. Offset is lowered if the boiler water temperature is hotter than necessary. The system lowers the value of Temp. Offset immediately by 2° any time a primary zone thermostat is satisfied before the boiler water temperature reaches Temp. Off. In this instance the primary zone is defined as the zone which causes the boiler to fire during a firing period.

The control system provides that the boiler does not fire until at least five minutes has elapsed since it was last shut off. A call for heat from a heating zone then initiates a firing cycle of the boiler water temperature is below the value of Temp. Off−10°. Once the boiler is actuated, it continues to fire until the boiler water temperature reaches Temp. Off or all zones stop calling for heat.

Boiler water temperature is sensed every 15 seconds in the range 88° to 225° F. Temperatures slightly below 88° are treated as 88°, and those slightly above 225° are treated as 225°. Outdoor temperature is sensed in the range of −20° F. to 80° F., and temperatures slightly below −20° F. are treated as −20° F. while those slightly above 80° F. are treated as 80° F.

A second primary function of the control system is to distribute heat remaining in the thermal mass of the boiler to the heating zones after the boiler is shut off and the thermostats are satisfied. In a first mode of operation, instead of a circulator pump or zone valve shutting off as soon as a thermostat switch opens, the circulator or valve is maintained on for an additional 10, 15 or 20 minutes. The additional circulation time is based upon the time that has elapsed between the last call and the current call for heat by that zone. The run time is initialized at 10 minutes when power is turned on to the control system and is then reset to: 10 minutes if off time between heating calls exceeds one hour; or 15 minutes if off time between calls is between ½ and 1 hour; or 20 minutes if off time between calls is less than ½ hour. This first mode of operational heat dumping continues regardless of the boiler water temperature, unless a lower limit of 88° is reached, or whether other heating zones are calling for heat.

A second mode of operation for heat dumping occurs when the boiler water temperature is above 110° F., the ambient temperature is below 64° F., and no zone pump is running. Under this set of conditions, the control system activates the first zone and continues to dump heat therein until the boiler water temperature drops to 105° F. or another zone requests heat. The first zone is selected at the time of installation of the microprocessor based control system to be that zone which is considered to be the most difficult to heat, and the designation of that zone is not alterable by the control system.

An aquastat mode of operation is instituted by closure of a switch, as by an associated aquastat clock, indicating a time period during which domestic hot water is normally in demand or by closure of another control switch. During this time period, the boiler reverts to a normal mode of operation, not under control of the microprocessor based control system. However, the microprocessor is operational during this time period and prevents the circulators from being turned on until the boiler water temperature exceeds 140° F. No heat dumping or temperature modulation occurs during this time period, such that the values of the variables within the program are not altered.

Referring to FIG. 1, the following simplified explanation of this control and power supply circuit is presented to enable an understanding of its basic functions. Explanations of the somewhat standard functions of many of the diodes, resistors and capacitors, used for functions such as coupling, smoothing or isolating, are omitted from this description, such that the major functions of the circuit are emphasized to convey an elementary understanding thereof. This electrical control and power supply circuit includes an input step down transformer 12 which is coupled to an AC power supply such as a 115 volt AC supply voltage. The output of the secondary side of transformer 12 is rectified (halfwave) by diode 14, and is then coupled across two capacitors 16 to produce a smoothed 30 volt DC power supply. This DC power supply is then coupled through a voltage reducing resistor 18 to a voltage regulator 20 which produces therefrom a 5 volt DC regulated voltage supply, primarily for the digital logic of FIGS. 2 and 3.

The circuit includes an operational switch 22 which has two positions, a first normal operation position in which the switch is shown in FIG. 1 in which power from the regulated 5 V power supply is supplied to the microprocessor, and a second override position in which the microprocessor is without power and the heating system is coupled to operate in a conventional manner.

The stepped down AC voltage from transformer 12 is also connected across three thermostats 24 which control the heating of three zones of an enclosed structure such as a house. Each thermostat operates in a conventional manner 0 to close the contacts of a switch 26 when the sensed temperature falls below a set value and to open those contacts when the sensed temperature rises above that set value.

FIG. 1 illustrates four substantially identical circuits 28, the top three of which control the actuation of solenoids 30, which in turn close the contacts of switches 22, each of which activates a circulator pump for one of three circulation zones in a typical three zone heating arrangement. The fourth circuit controls the actuation of a solenoid 24 which in turn actuates a boiler control 0 switch 26 to fire the heating system boiler.

Referring to the top circuit 28 for actuation of the circulator for zone 1, upon closure of switch 26 indicating a request for heat in zone 1 of the structure, diode 32 passes a half rectified wave from the secondary side of transformer 12 to capacitor 43 which is charged thereby and provides a voltage to junction 34 which provides an input to port 24 of the microprocessors thereby indicating to the microprocessor, by the high or one input on that line, a request for heat in zone 1. The connection of port 24 to junction 34 also performs a further important function of providing a voltage and current sink for the half wave rectified voltage passed through diode 32, which effectively prevents that half wave rectified voltage from actuating the remainder of the circuitry to the right, along with solenoid 30.

The microprocessor then, pursuant to the operating software described in detail later in logic flow diagrams, particularly with regard to FIGS. 4 to 13, issues a high output signal on port 11 which is coupled to junction 36. The high signal at junction 36 is amplified by a driver amplifier 38 which in turn actuates solenoid 30 to turn on the circulator motor or zone value for zone 1 to supply 0 heat thereto. The control circuits 28 for heating zones 2 and 3 operate in a manner similar to that explained with respect to the control circuit for zone 1, and accordingly will not be explained further in detail herein.

The microprocessor also controls operation of the heating system boiler, pursuant to the operating software described in detail later in the logic diagrams shown in FIGS. 4 to 13. When the boiler is to be turned on, the microprocessor provides a high signal to port 10 which is coupled to junction 42 in the boiler control circuit 28. The high signal at junction 42 is amplified by a driver amplifier 44 which in turn actuates solenoid 24, thereby closing switch 26 and firing the boiler.

The control circuit includes a timed aquastat 23 for heating control systems in which a coil in the boiler supplies hot tap water for the structure and in which the boiler must be maintained at a high temperature during time periods when hot tap water is required regardless of the heating requirements of the structure. Accordingly, during those normal hours of use an aquastat override is provided to operate the boiler in a normal manner. The aquastat 23 normally includes a twenty-four hour clock 25 which can be set for different on and off time durations to provide hot tap water during normal hours of usage. In further embodiments, other control switches can also be included to provide an override to accommodate hot tap water requirements.

When hot tap water is desired, clock 25 closes switch 27 to provide 24 volts AC power to diode 40 which passes a half wave rectified voltage to allow the system to operate in a normal manner as follows. The half wave rectified voltage through diode 40 charges capacitor 41 and signals the microprocessor via port 27 that the aquastat is requesting 0 heat, which signals the microprocessor to enter a suspended mode of operation in which all variables in the program remain at their current status and are not changed or modified until after the aquastat request is satisfied. The positive voltage to which capacitor 41 is charged passes to driver amplifier 44 to actuate solenoid 24 and switch 26 to turn on the boiler in a normal mode of operation under its traditional controls rather than under control of the microprocessor.

An override switch 22 provides for a complete disconnection of the microprocessor-based control system, and return of control to the traditional control system for the boiler. When the override switch 22 is placed in its override position (opposite to the position shown in FIG. 1), power to the microprocessor from the regulated 5 volt power supply is terminated, thereby inactivating the microprocessor. Further, assume that the thermostatic switch 26 for zone 1 closes, the half wave rectified voltage through diode 32 charges capacitor 43. The port 24 connection of the microprocessor to junction 34 no longer functions as a voltage and current sink, and the voltage across capacitor then actuates driver amplifier 38 and solenoid 30 to turn on the circulation in zone 1. Also, the voltage from transformer 12 passes through diode 32, through diode 45 and switch 22 to charge capacitor 41 and turn on the boiler also, as in a normal mode of operation uncontrolled by the microprocessor.

Figure 2:
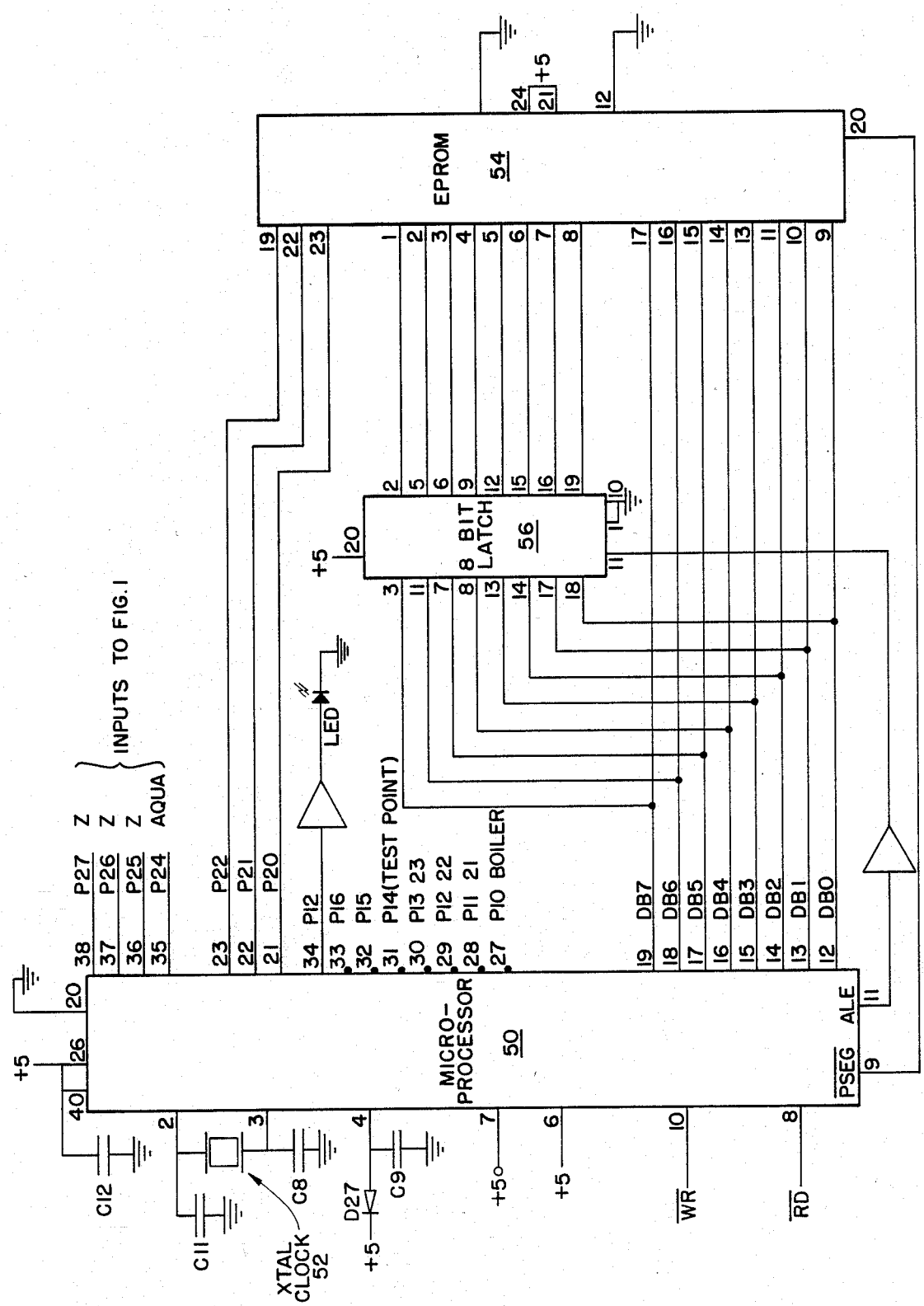
FIG. 2 illustrates the detailed pin connections of one embodiment of a digital logic circuit having a microprocessor and associated digital components pursuant to the teachings herein.
Figure 3:
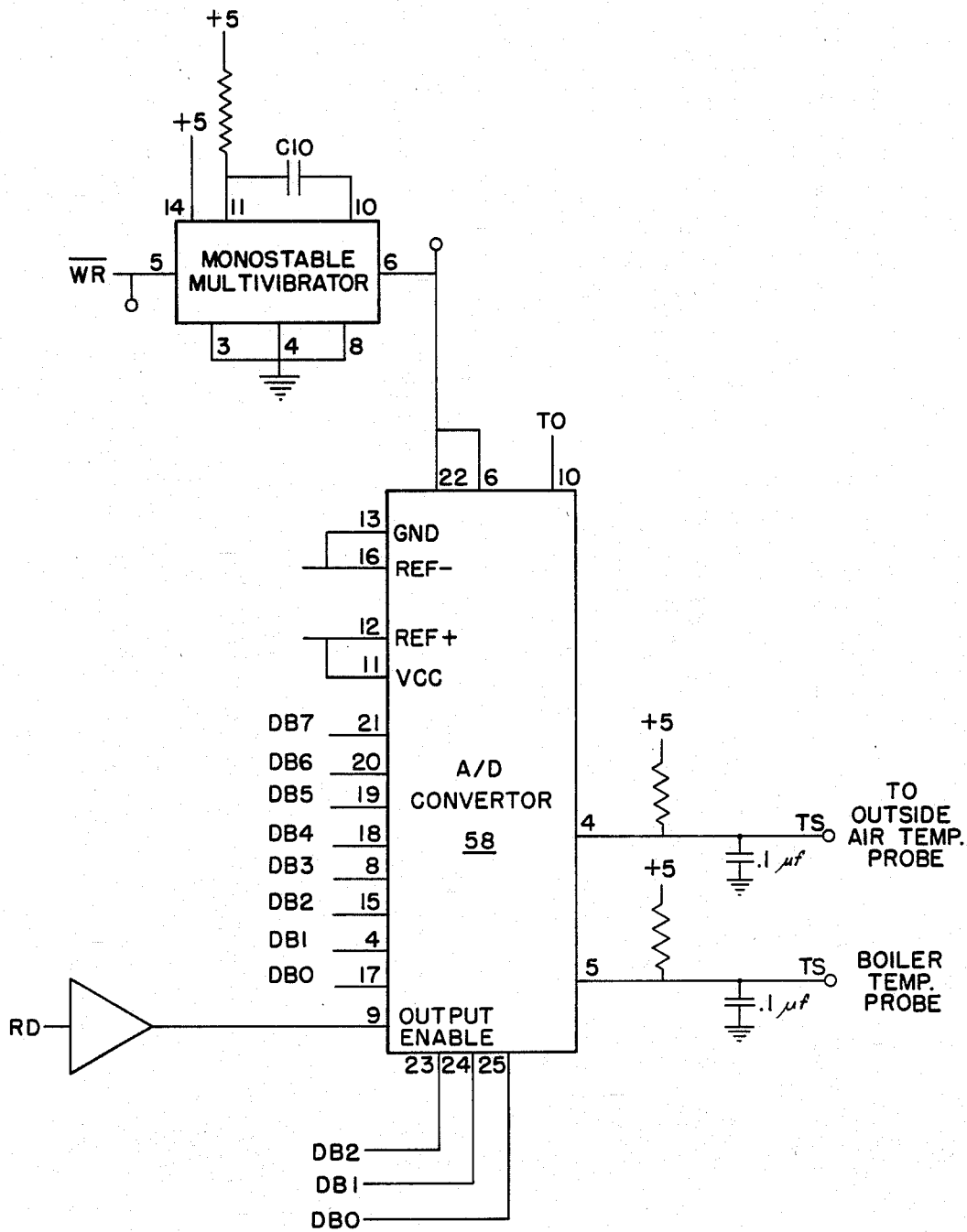
FIG. 3 illustrates the detailed pin connections of one embodiment of associated digital and analog circuitry designed for use with the circuit of FIG. 2.

FIGS. 2 and 3 illustrate the detailed port and pin connections of one embodiment of digital logic circuits designed pursuant to the teachings of the present invention. These logic circuits are designed around an Intel 8035L or 8048H microprocessor and the port and pin connections illustrated therein are exemplary of only one embodiment and depend to a large extent upon the architecture of the software designed to operate the microprocessor. Other 0 types of microprocessors and associated digital circuits could obviously be utilized in alternative embodiments. For instance, an Intel 8022 microcomputer could be utilized in the present control system which is a single chip microcomputer incorporating therein the functions all of the separate components illustrated in FIGS. 2 and 3.

The microprocessor 50 has an associated crystal clock 52 operating at 3.5795 MHz coupled thereto in a usual manner, with power supply and input and output terminals connected as shown. An associated Erasable Programmable Read Only Memory (EPROM) 54 which can also be an Intel component, is utilized as memory to store the program carrying out the logic flow sequences represented in FIGS. 4 through 13 and also to store all data utilized in the program. An eight bit latch 56 interfaces between the microprocessor and the EPROM, and is utilized in a normal fashion to temporarily store or latch digital data therein.

FIG. 3 illustrates the detailed pin connections of one embodiment of an analog to digital converter 58 and monostable multivibrator or one-shot 60 designed to be utilized with the digital logic circuit of FIG. 2 in a microprocessor controlled heating system. The A/D converter interfaces the microprocessor with inputs from the heating system, and in particular converts the various temperature readings to a digital format for use in the microprocessor. The monostable multivibrator is utilized in a normal fashion to allow readings by the microprocessor of the converted digital output of the A/D converter without danger that the output values will change in the middle of a reading.

FIGS. 4 through 13 are logic flow diagrams illustrating the principles of one embodiment of operational software for controlling the microprocessor 50 and its associated digital circuitry in a heating control system 0 pursuant to the present invention. Other logical approaches might also be utilized in alternative embodiments implementing the principles of the present invention.

It would be instructional before explaining the logic flow diagrams in detail to first review the overall control functions performed by the software. The microprocessor based control system has several inputs which it checks (generally every 15 seconds): the boiler temperature; the request status of a thermostat in each of three heating zones; the request status for the aquastat for domestic hot water; and the outside temperature (which is sensed every 5 minutes). The microprocessor based control system can control: the zone control valve or pump for each heating zone; the burner; and an indicator light in the form of an LED which is turned on whenever the system is in its normal control mode. It is turned off if the system is in an over-ride mode or if there is an aquastat request (when the aquastat controls the boiler), or if the unit detects either of its temperature sensing circuits to be malfunctioning (short circuited or open circuited).

In normal operation, when a heating zone calls for heat its pump is turned on immediately, and stays on for at least as long as the zone continues asking for heat. If any zone requests heat, the boiler is turned on unless it has been turned off in the last five minutes, or if it is already at or above the temperature Temp. Off—10°. Temp. Off is periodically recalculated according to the formula Temp. Off = Temp. Offset−(1.5)(Temp. Outside) (averaged). An averaged outside temperature is arrived at by adding one quarter of the current outside temperature to three quarters of the previous average, every 5 minutes.

Temp. Offset is a variable which is initially set to a value representative of an average house. When the control system fires the boiler for the first time after it is turned on, if all of the zone heating requests are satisfied and Temp. Off still has not been reached, one exact adjustment is made to Temp. Offset such that Temp. Off is equal to the actual boiler temperature when the last zone request was satisfied. Thereafter all adjustments to Temp. Offset are made iteratively in the manner previously explained to adjust Temp. Off upward or downward according to whether the boiler water temperature is sufficiently high to properly heat the several heating zones without being too high. For the purpose of adjusting Temp. Offset, the first zone to request heat after the five minute boiler off time is designated as the master zone for that boiler cycle. If the request for heat from the master zone is satisfied before the boiler reaches Temp. Off, then Temp. Offset is adjusted downward by two degrees. If the master zone requests heat three minutes after the boiler is turned off, then Temp. Offset is increased one degree for each fifteen seconds (to a maximum of eight degrees when five minutes is reached) until the boiler has been off for a sufficiently long time (five minutes) to be turned on. When the boiler is turned on the next time, a new master zone is selected.

The boiler is turned off when the temperature of the boiler water reaches the calculated temperature, or when all heating requests from the several zones are satisfied. Circulation in each heating zone continues in a first heat dumping mode, after the zone heating request is satisfied, for a period of time which depends upon the time elapsed between the last request and the current request for heat from that zone. The longer the off time between requests, the shorter is the period of time the pump is left running. A second mode of heat dumping occurs when the boiler water temperature is above 110° F., the ambient temperature is below 64° F., all mode one heat dumping is completed, and no zone is requesting heat. Under this set of conditions, the control system activates the circulation system for zone 1 and continues to dump heat therein until the boiler water temperature drops to 105° F. or another zone requests heat. However, upon completion of an aquastat request, heat dumping is suspended until a thermostat requests heat.

An aquastat request suspends execution of the program in the microprocessor and returns control of the heating system to its conventional control system. The boiler is immediately turned on and remains on, and circulation is initiated only if a zone requests heat and the boiler temperature is greater than 140 degrees. When the aquastat request disappears, the microprocessor based control system resumes normal operation exactly where it left off before the aquastat request.

The logic flow diagrams illustrated consecutively in FIGS. 4 through 10 and in the subroutines of FIGS. 1 through 13 explain the operation of the software for the microprocessor. In a usual implementation of a program as represented by the logic flow diagrams of FIGS. 4 through 13, the microprocessor typically runs through the entire program in a few milliseconds, and then is idle for a fifteen second period, after which it runs through the entire program again in several milliseconds, and then is idle for another fifteen second period, etc.

When power is first applied to the microprocessor, it initializes a number of operations and data therein as follows. The loop counter for the microprocessor is set to one, indicating the first run through the program. In the formula Temp. Off=Temp. Offset −(1.5)(Temp. Outside) which controls the temperature Temp. Off at which the boiler is turned off, Temp. Offset is initially set in memory to 205. All pump run times are initially set in memory at ten minutes. All offtimes in memory are also set to their highest value (255). No zone is designated as the master heating zone. Temp. Outside is sensed and placed in memory at the current outside temperature, or 235 if a short or open circuit is sensed, as described in further detail below. A flag is also set indicating that operation has just been initiated and the program is running through the very first cycle. The flag is utilized in conjunction with an initial, one-time setting of Temp. Offset, as explained with reference to the program in FIG. 7.

After the initialization step, the program proceeds to the main programming body. The main body of the program refers frequently to the subroutines illustrated in FIGS. 12 and 13 which are respectively the subroutines to read a temperature and to check the thermistors for open and short circuits. Accordingly, those subroutines will be explained first herein.

Figure 12:
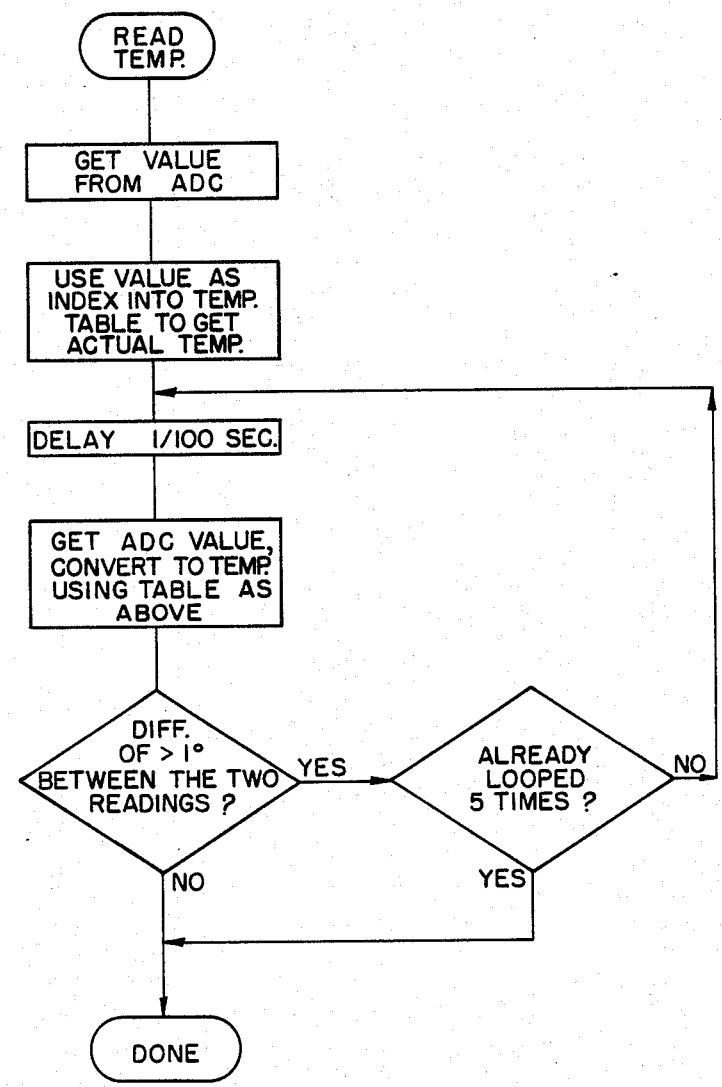

Referring to FIG. 12, a temperature is read by taking a reading from the appropriate output terminals of the A/D converter, which is a digital word representing an analog value of the temperature as determined by the resistance of one of the thermistors. The voltage versus temperature characteristics of the circuit having the thermistor therein are stored in a table in memory, and the voltage is compared with the values in the stored table until a match is obtained, indicating the actual temperature. In the stored table, voltages indicative of temperatures under 88° F. which are still credible temperatures are treated as 88° F., and likewise voltages indicative of temperatures slightly above 225° F. are treated as 225° F. Voltages indicative of temperatures grossly outside of the 88° to 225° F. range are considered to be indicative of an open or short circuit, and a special value of 235° F. is placed in memory, which is indicative of the sensed open or short circuit condition. The subroutine then delays for 1/100 second and takes a second reading in the same manner, which is utilized as an error check to ensure accuracy. The two temperature readings are then compared with each other and if the second reading is within 1° F. of the first reading, the first reading is considered correct and the digital value of that reading is passed to the main program. If the two readings are greater than 1° F. apart, the first reading is not considered to be correct, and subsequent readings are then taken until a match within 1° is obtained, at which time the subroutine is finished. A maximum of five readings are taken in this loop, after which the fifth reading is assumed to be correct.

Figure 13:
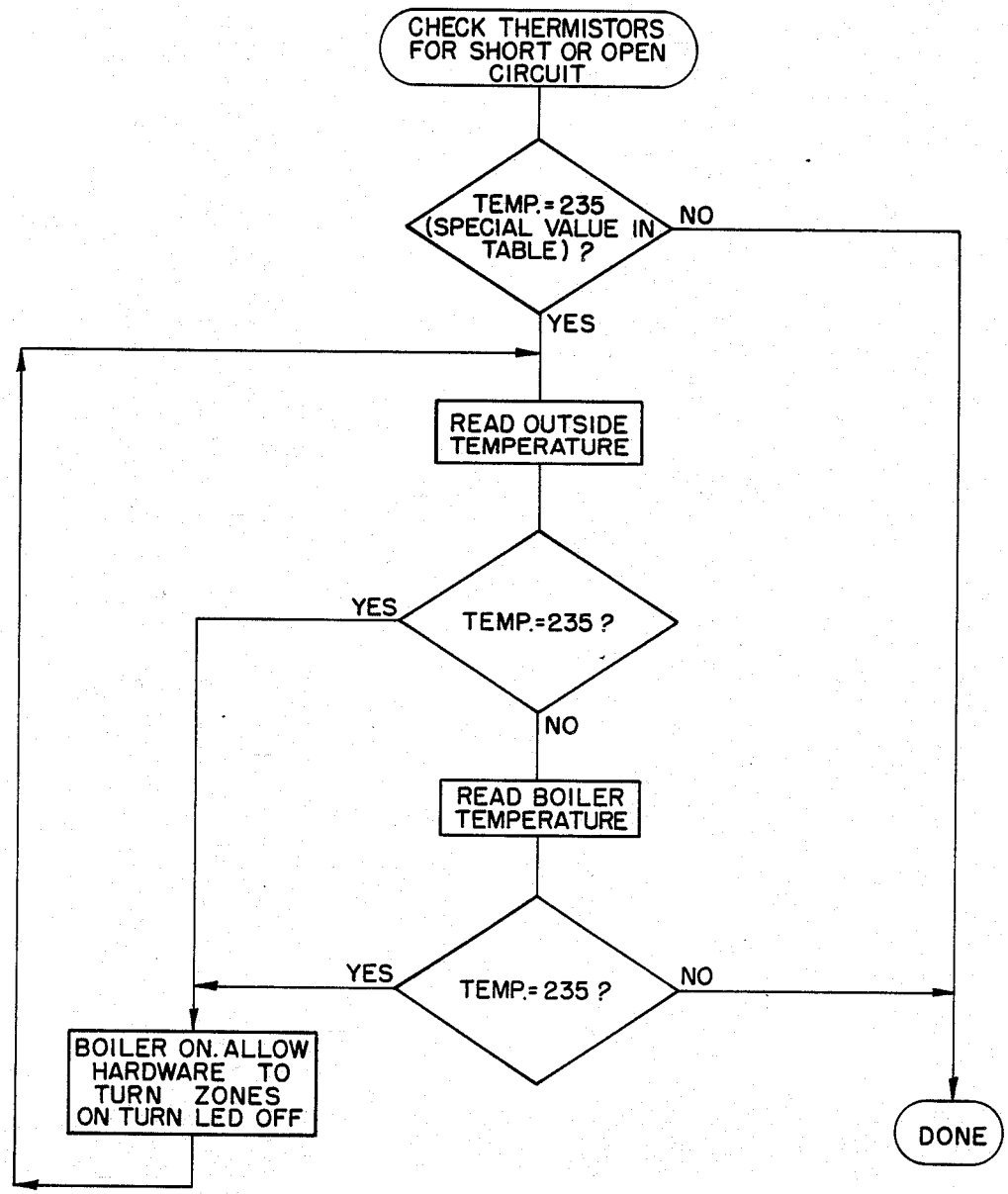

Referring to FIG. 13, a thermistor is checked for an open or short circuit as follows. A temperature reading from the thermistor is taken pursuant to the subroutine of FIG. 12, and if it is not 235° F. (the special value indicating a short or open circuit), it is concluded that no short or open circuit exists and the subroutine is finished. If the temperature is 235° F., an outside or ambient temperature reading is taken, and that temperature is compared to determine if it equals 235° F. If it does not, a boiler temperature reading is taken and a similar comparison taken. If the boiler temperature does not equal 235° F., the subroutine is finished. However, if either the ambient or the boiler temperature equals 235° F., the indicator LED (indicating normal 0 microprocessor control) is turned off, the burner is enabled to be turned on in response to a thermostat request, the zone circulators are turned on and off solely in response to thermostat requests, and the subroutine is repeated with new ambient and boiler temperature readings, and etc.

Figure 4:
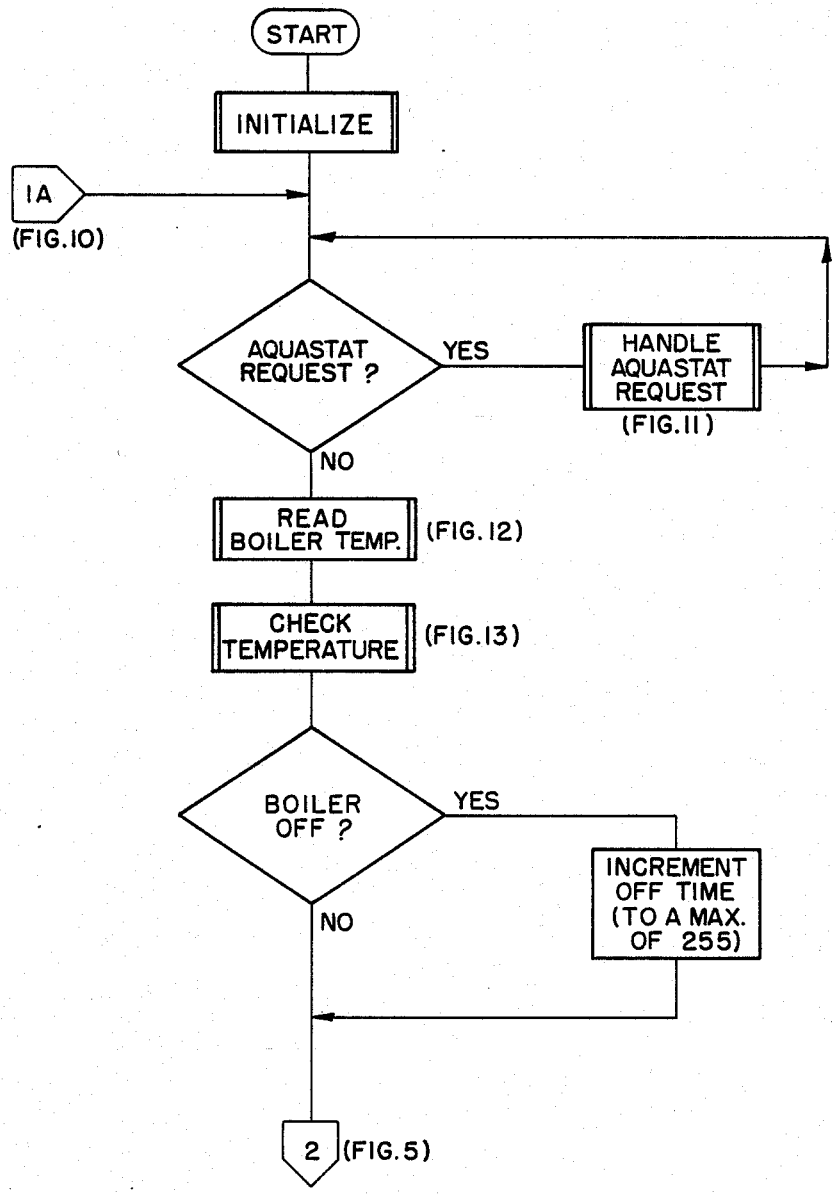
FIGS. 4 through 13 are logic flow diagrams illustrating the principles of the operational software for controlling the microprocessor in a heating control system pursuant to the present invention.

Returning to the main program in FIG. 4, the program first checks to determine if there is an input request from the aquastat, indicating a time during which hot tap water is normally in demand. If the aquastat status is positive (switch 27 is closed), the program calls and stays in the aquastat subroutine shown in FIG. 11 until the aquastat request is satisfied.

Figure 11:
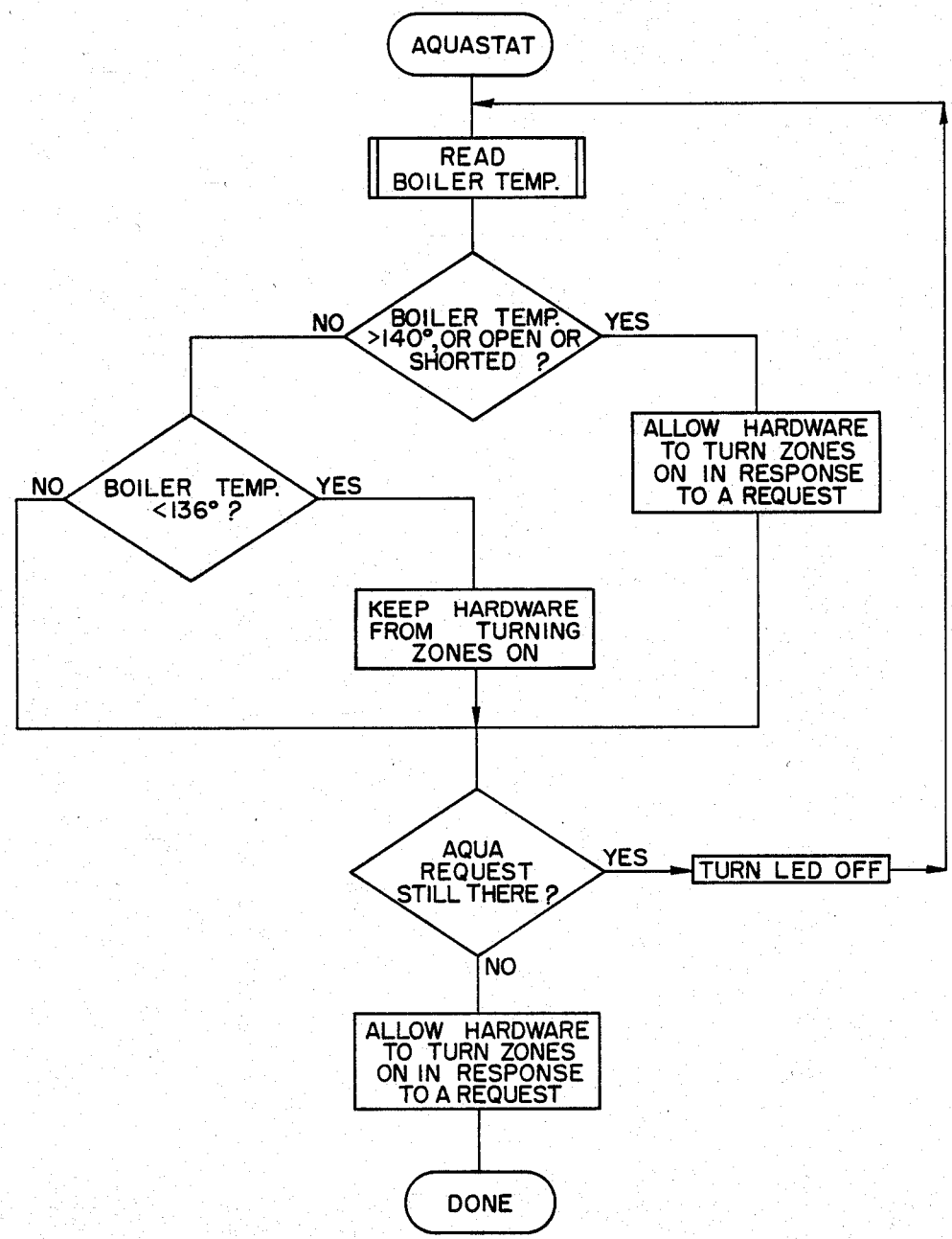

Referring to the subroutine of FIG. 11, the temperature of the boiler is initially read. If the boiler temperature is over 140° F., the boiler water is considered sufficiently high to satisfy hot tap water requirements, and accordingly the heating requirements of the structure are allowed by the microprocessor to be satisfied, as indicated by the YES loop. If the boiler temperature is under 140° F., a 136° F. temperature check is included to prevent loop oscillation. If the temperature is below 136° F., the microprocessor inhibits the circulators in response to thermostat requests. The microprocessor then rechecks on the status of the aquastat request. If the aquastat switch 27 is still closed, the LED is turned off (indicating the normal microprocessor control is not operating) and the subroutine again loops through itself, etc. Accordingly, the program remains in the aquastat subroutine until the aquastat request is turned off by switch 27 opening.

Returning to the main program of FIG. 4, after the aquastat request is turned off, the boiler temperature is read, utilizing the FIG. 12 subroutine and the boiler thermistor checked for open and short circuits with the FIG. 13 subroutine. If the boiler is off, the boiler off time is incremented by 1 (to a maximum of 255). An increment of 1 effectively adds 15 seconds to the accumulated off time since the program recycles once every fifteen seconds, as explained in reference to FIG. 10.

Figure 5:
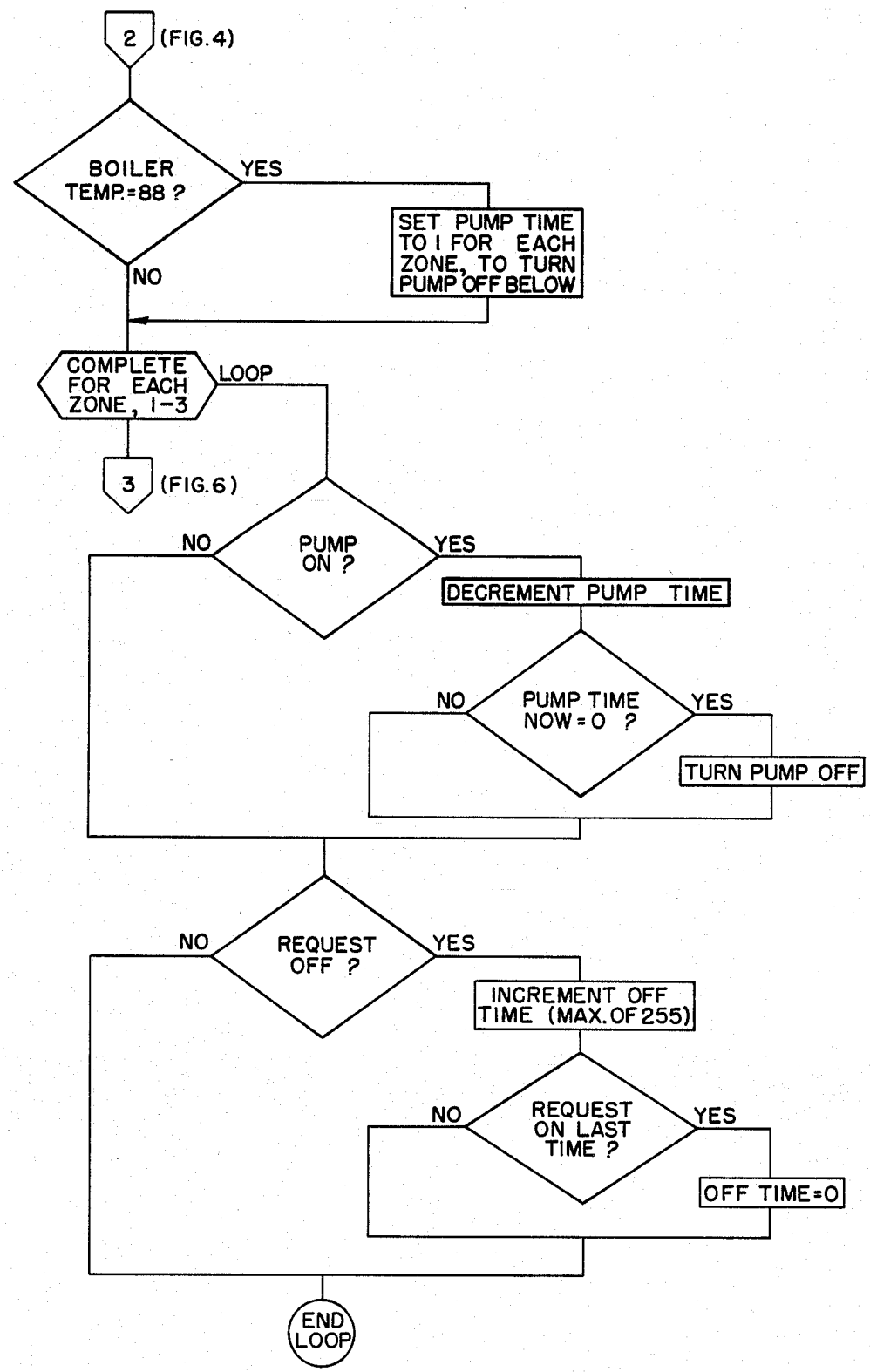

If the boiler is on (program continues in FIG. 5), the boiler temperature is compared with an 88° F. value. Basically, the 88° F. value is a temperature at or below which phase one heat dumping shown in the rest of FIG. 5 is not carried out. Accordingly, if the actual boiler temperature is 88° F. or less, the circulator time for each zone is set at 1, which results in the rest of the program in FIG. 5 turning the pumps off, as is explained below.

The remainder of the logic flow in FIG. 5 concerns mode one heat dumping as explained previously. The loop shown in the remainder of FIG. 5 is cycled through once for each zone. In zone 1, for example, if the circulator is off and there is no request for heat, the loop is finished for zone 1, and proceeds to zone 2, etc. However, in zone 1 if the pump is on, the pump time is decremented by one and if it is now zero, the zone pump is turned off. The status for the zone 1 thermostat is next checked, and if it is off, its off time is incremented by 1. Next, if the request was on during the last program cycle (remember that this is a request off loop), the pump off time is reset to zero.

Figure 6:
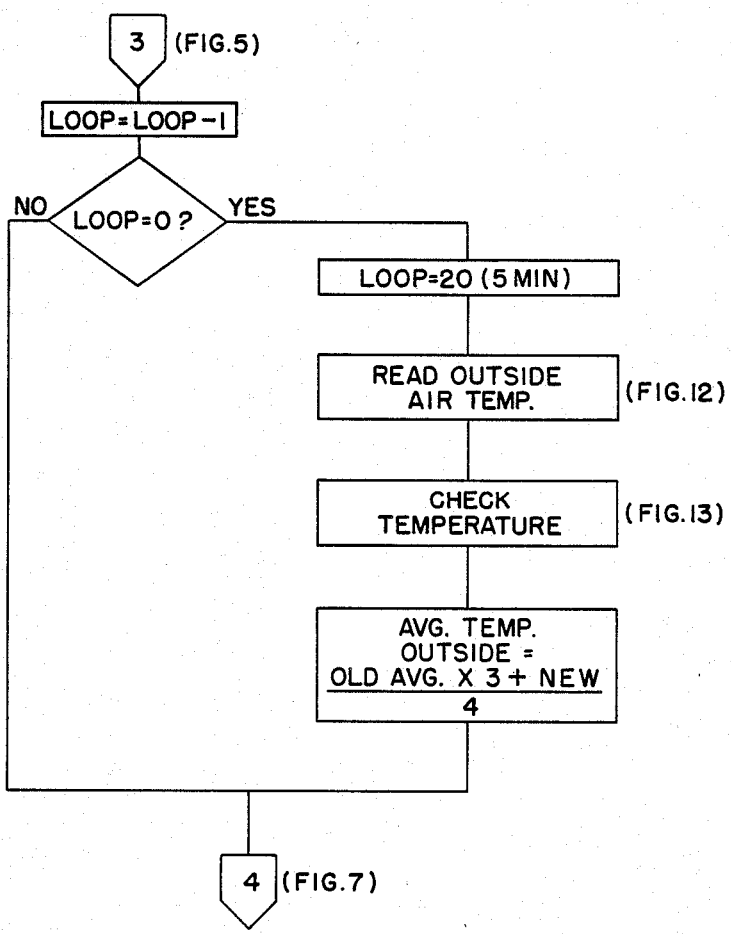

Referring next to FIG. 6, the logic flow diagram therein basically takes an ambient temperature reading every 5 minutes and recomputes the averaged ambient temperature. The loop counter is initially decremented by 1 (represents minus 15 seconds as explained previously) to reflect the current loop, and the status of the count is checked. If the loop count is now 0, it is reset to 20 (occurs once every 5 minutes), the ambient temperature is read, checked for open, and short circuits, and a new averaged ambient temperature calculated and stored in memory according to the formula shown in FIG. 6.

Figure 7:
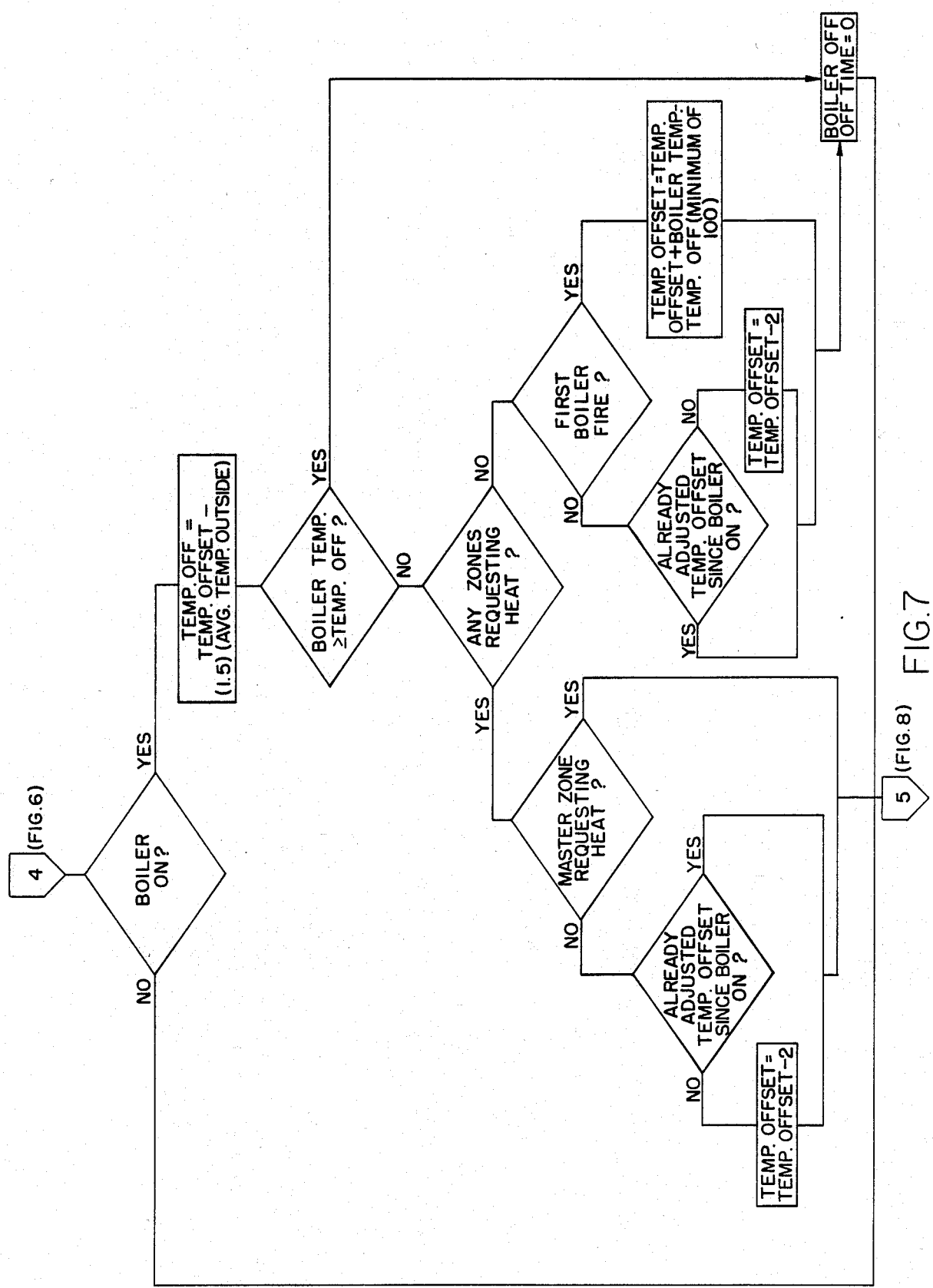

Proceeding to FIG. 7, the logic flow diagram therein initially recalculates Temp. Off, and then recalculates Temp. Offset. If the boiler is off, the program skips this loop. However, if the boiler is on, Temp. Off is recalculated according to the formula shown in FIG. 7. If the boiler temperature is above Temp. Off, the boiler is shut off and the boiler off time is set to zero.

If the boiler temperature is below Temp. Off and at least one zone is requesting heat, an initial determination is made as to whether the request is from the master zone for that cycle. If not, and Temp. Offset has not been readjusted since the boiler has been turned on, then Temp. Offset is readjusted downward by 2° F. (since Temp. Off has not been reached and the master zone has stopped requesting heat). However, the burner remains on until Temp. Off is reached, and accordingly this adjustment is only made during the first cycle after the master zone has stopped calling for heat, and not every subsequent cycle every fifteen seconds until the nonmaster zone thermostats are satisfied.

If the boiler temperature is below Temp. Off, and no zones are requesting heat, then if this is the first cycle of the program, indicated by the flag that was set on initialization, a first initial adjustment to Temp. Offset is made, as explained previously. Temp. Offset is then reset initially according to the formula shown, which essentially results in Temp. Off being the present boiler temperature, and the boiler 0 off time is set to zero. If this loop is not a first time firing, since the boiler is on and no zones are requesting heat, Temp. Offset is reduced by 2° F. and the boiler off time is again reset to zero.

Figure 8:
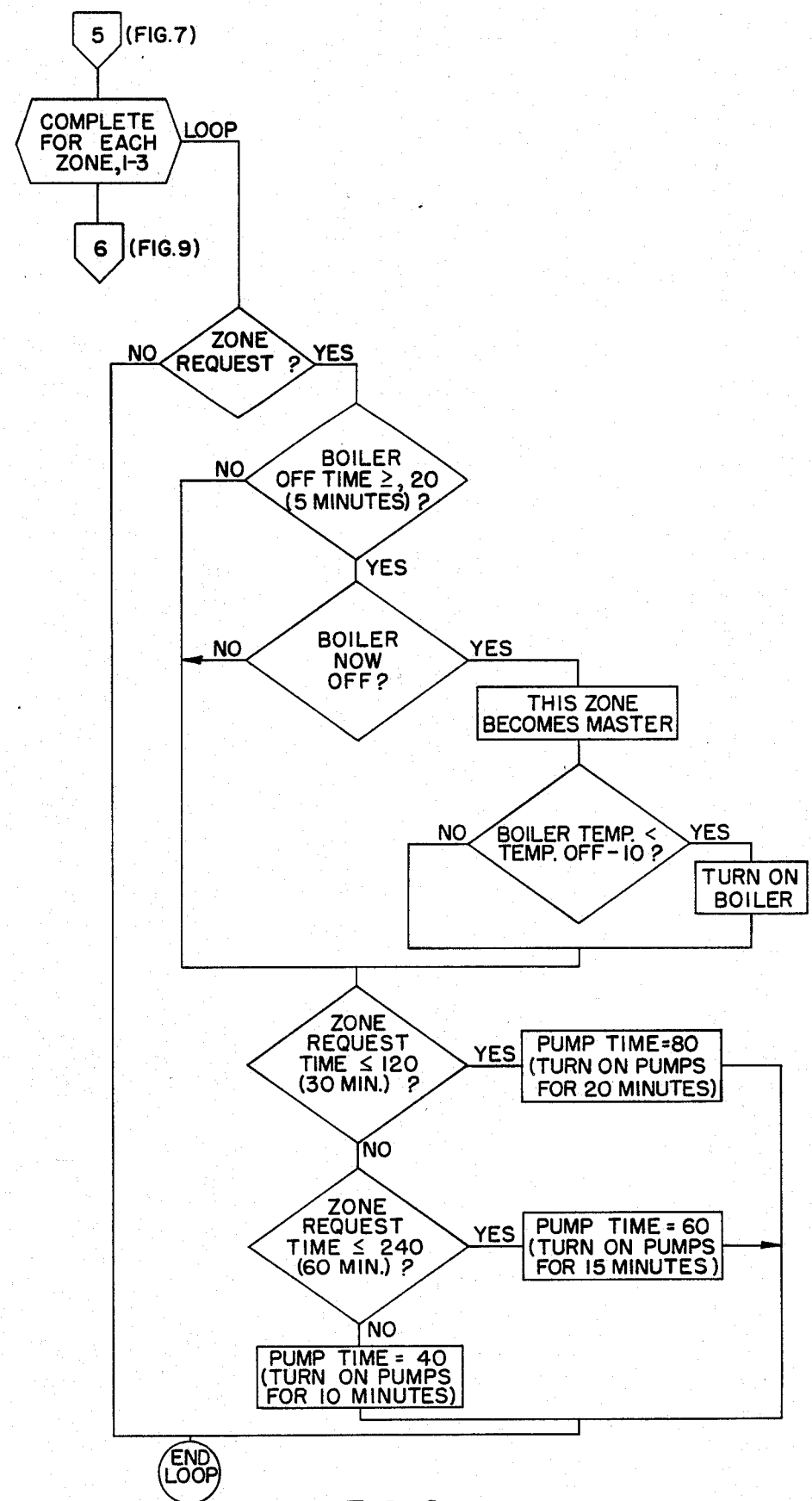

Referring next to FIG. 8, the loop shown therein is completed once for each heating zone. If no zone is requesting heat, the program proceeds to FIG. 9. However, if a zone is requesting heat and the burner has been off for at least 20 loop counts (5 minutes) and is now off that zone is now designated as the new master zone. If the boiler temperature is less than Temp. Off+10°, then the burner is turned on.

Next, the pump run times are determined. If the zone request off time in loop cycles, as shown in FIG. 5, is less than 120 (thirty minutes), the pump circulation time is set for 80 loop cycles (20 minutes). If that zone request off time is less than 240 (60 minutes), the pump circulation time is set for 60 loop cycles (15 minutes). If the zone request off time is greater than 240 (60 minutes), then the pump circulation time is set to 40 loop cycles (10 minutes).

Figure 9:
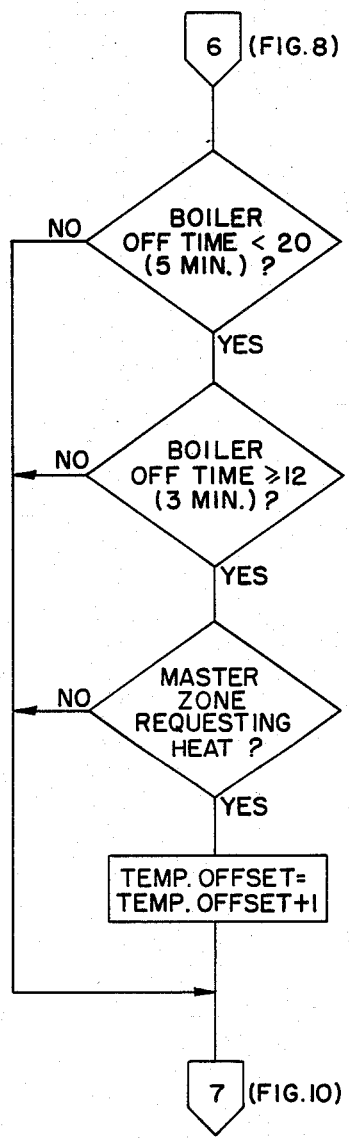

Proceeding to FIG. 9, if the boiler off time is less than five minutes, more than three minutes, and the master zone is requesting heat, then Temp. Offset is incremented by 1° F. Note that this operation can be repeated every 15 seconds between 3 minutes and five minutes to increment Temp. Offset by a maximum of 8° F. during each such timing cycle.

Figure 10:
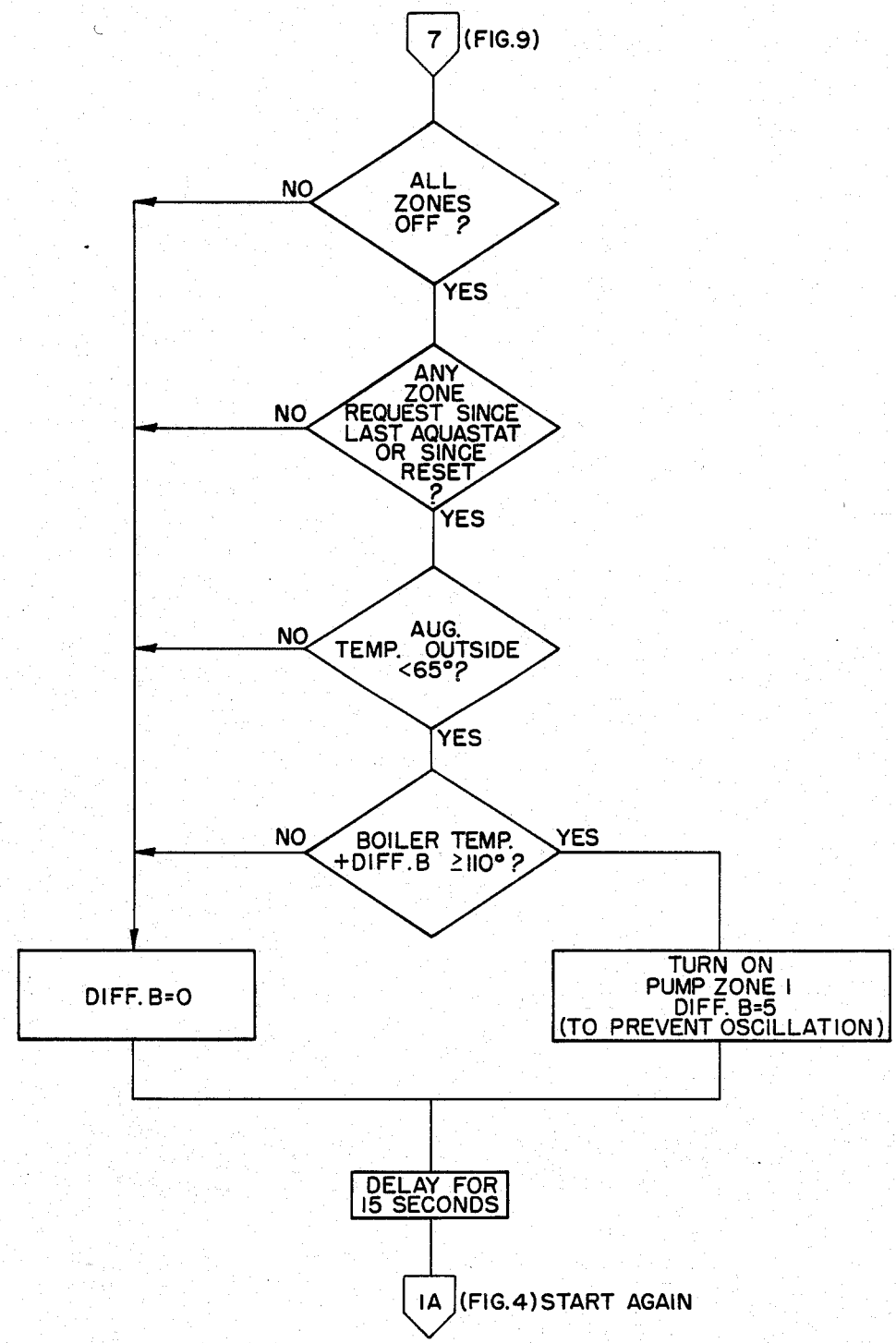

Proceeding to FIG. 10, the logic flow diagram for the second mode of heat dumping is shown. That is, if all zone requests are off, and there has been a zone request after the last aquastat request, and the ambient temperature is less than 65° F., and the boiler temperature plus Temp. Diff. B (5°) is greater than 110°, then the zone 1 circulation pump is turned on and Temp. Diff. B is set to 5° F. (a 5° F. swing is programmed in to prevent oscillation). Note that if any of the above conditions is negative, then Temp. Diff. B is reset to zero. A fifteen second time delay is then introduced before the program recycles upon itself and 5 starts again, as shown in FIG. 4. In a normal complete program loop, unless it is captive within a given loop, such as in the aquastat subroutine, the program runs from FIG. 4 to FIG. 13 in several milliseconds and then remains idle for 15 seconds, and then loops again, etc.

While a preferred embodiment and many variations thereon have been described in detail herein, it should be understood that many other variations are possible within the context of the teachings of the present invention.

What is claimed is:

1. A control system for a hydronic heating system for an enclosed structure, including a boiler and at least one heating zone delivery control system for controlling delivery of heat from the boiler to said at least one heating zone, comprising:
   a. first means for sensing the ambient temperature external to the enclosed structure;
   b. second means for sensing the water temperature of the boiler; and
   c. control means, including a central digital processing unit having memory therein, coupled to the outputs of said first and second sensing means and being programmed in said digital memory to determine an upper temperature for the boiler at which the boiler is shut off and to store a value in said digital memory indicative of the upper temperature, and to periodically redetermine said upper temperature for the boiler in accordance with the heating demands of the enclosed structure, and to periodically update the value stored in said digital memory indicative of the upper temperature, said control means being programmed to measure the length of time between the boiler being shut off and a request by a thermostat for delivery of heat and is responsive thereto to increase said upper temperature when said measured length of time is below a predetermined time duration, and said control means also being programmed to increase said upper temperature in proportion to the difference between said measured length time and said predetermined time duration.

2. A control system for a hydronic heating system as claimed in claim 1, wherein the control system includes a plurality of thermostats in different zones of the structure, and said thermostat to which the control means is responsive to increase said upper temperature is selected by said control means from all of the thermostats of the heating system in dependence upon the timing of the heat requests by all of the thermostats.

3. A control system for a hydronic heating system as claimed in claim 1, wherein said control means is programmed to decrease said upper temperature in response to a thermostat request for delivery of heat being satisfied prior to the boiler water temperature reaching said upper temperature.

4. A control system for a hydronic heating system as claimed in claim 1 or 3, wherein said control means is programmed to continue the delivery of heat into a heating zone, after a request by a thermostat has been satisfied, for a variable period of time inversely proportional to the measured length of time between requests for heat by that thermostat.

5. A control system for a hydronic heating system as claimed in claim 1 or 3, wherein said control means is programmed to continue the delivery of heat into a heating zone when not thermostat in the heating system is requesting heat, and said first means for sensing the ambient temperature senses a temperature below a given threshold ambient temperature, and said second means for sensing the boiler water temperature senses a temperature above a given threshold boiler temperature.

6. A control system for a hydronic heating system as claimed in claim 1 or 3, wherein the control system is retrofitted to an existing heating control system which normally maintains the boiler water temperature in a given temperature range to provide domestic hot tap water, and said control system is programmed to inhibit boiler firing unless a switch is actuated to indicate a requirement for hot tap water.

7. A control system for a hydronic heating system as claimed in claim 6, wherein said switch is timer actuated during times of normal requirements for domestic hot tap water.

8. A control system for a hydronic heating system as claimed in claim 1 or 3, wherein the control system is retrofitted to an existing heating control system, and includes an override means for reverting control over the hydronic heating system to the existing heating control system.

9. A control system for a hydronic system as claimed in claim 1 or 3, wherein said control system is programmed to check said first and second sensing means for short and open circuits.

* * * * *